United States Patent Office 2,911,381
Patented Nov. 3, 1959

2,911,381

METHOD OF IMPROVING THE FOAMING CHARACTERISTICS OF PARTICULATE FOAMABLE STYRENE POLYMERS

Murray H. Roth, Springfield, Mass., assignor to Monsanto Chemical Company, St. Louis, Mo., a corporation of Delaware No Drawing. Application September 10, 1956
Serial No. 608,677

6 Claims. (Cl. 260—2.5)

The present invention relates to the treatment of particulate foamable styrene polymer compositions to improve the foaming properties thereof.

Styrene polymer foams constitute a valuable class of materials which are finding increasingly wide application in the fabrication of numerous consumer and industrial articles. Such styrene polymer foams can be prepared by heating small particles of styrene polymers which have volatile organic compounds incorporated therein as foaming agents, such heating preferably being effected by either hot water or steam. The above described method of preparing styrene polymer foams is known to suffer from two deficiencies. First, the pore sizes of the foams so obtained tend to be irregular and relatively large, e.g., the majority of the cells have diameters of greater than about 0.05 inch, whereas the most desired foams have a substantially uniform cell size with the majority of the cells having a diameter of less than about 0.02 inch. Secondly, the particulate styrene polymers which contain relatively large quantities of foaming agent, e.g., 7% or more, frequently do not foam well and yield foams having undesirably high densities.

It is an object of this invention to provide particulate foamable styrene polymer compositions which, when heated, yield foams having substantially uniform pore sizes, the majority of which have a diameter of less than about 0.02 inch.

Another object of this invention is to provide particulate foamable styrene polymer compositions containing relatively large quantities of foaming agent and which, when heated, yield foams of desired low densities.

Other objects and advantages of this invention will be apparent from the following detailed description thereof.

The above objects are obtained by treating particulate foamable styrene polymer compositions with dilute aqueous solutions of surface active agents.

The following examples are set forth to illustrate more clearly the principle and practice of this invention to those skilled in the art. All parts are by weight.

EXAMPLE I

Part A

A foamable styrene polymer composition containing 9 weight percent pentane is prepared by an aqueous suspension polymerization process employing as the suspending agent both a polyvinyl alcohol containing 12% unhydrolyzed acetate groups and a sodium salt of bis (sulfonaphthyl) methane. The polymer particles are obtained as clear, transparent beads having an average diameter of about ¼ inch.

Part B

Beads of foamed polystyrene are prepared by heating the foamable styrene polymer particles prepared in Part A above for 5 minutes in boiling water.

The foamed polystyrene beads have large irregular cell sizes and a density of about 12 lbs. per cubic foot.

EXAMPLE II

Part A

The foamable styrene polymer beads prepared in Example I, Part A, are soaked for 12 hours in a 1% solution of lauryl sulfate at 25° C. The treated polymer beads are then foamed by placing them in boiling water for 5 minutes. The foamed polystyrene beads have a heterogeneous structure with the center cores of the beads having large irregular cell sizes (comparable to the cell structure of the foamed beads prepared in Example I, Part B), but the surface layers of the beads have a very fine pore size in which the average cell diameter is less than about 0.02 inch. The density of the foamed beads is about 10 lbs. per cubic foot.

Part B

Aliquots of the foamable styrene polymer beads of Example I, Part A, are soaked for, respectively, 24, 48, 72 and 96 hours in a 1% lauryl sulfate solution at 25° C. The treated beads are foamed by placing them in boiling water for 5 minutes. As in Part A, the foamed styrene polymer beads have a heterogeneous structure consisting of a central core of large irregular cell sizes and a surface layer of fine pore sizes. It is further observed that the diameter of the central core of irregular cell size decreases and the thickness of the surface layer of fine regular pore size increases with the length of time that the foamable styrene polymer beads are soaked in the detergent solution. In the case of the beads soaked for 96 hours, the central portion of large irregular cell size is quite small and constitutes less than 25% by volume of the foamed styrene polymer beads.

EXAMPLES III–VII

Aliquots of the foamable styrene polymer beads prepared in Example I, Part A, are soaked for 24 hours in 1% solutions of, respectively, sodium dodecylbenzene sulfonate, an ethylene oxide condensate of nonylphenol, a dioctyl ester of a sodium salt of sulfosuccinic acid, a sodium salt of a 12–16 carbon atom alkyl sulfonate and cetyl pyridinium chloride, each of said solutions being maintained at 25° C.

The treated beads are foamed by placing them in boiling water for 5 minutes. In each case the foamed beads have a heterogeneous structure in which the central core has a large irregular pore size and in which the surface layer has fine pore sizes with a majority of the cells having a diameter of less than about 0.02 inch.

The foaming characteristics of particulate foamable styrene polymers are improved by immersing the polymer particles in a dilute aqueous solution of a surface active agent.

The surface active agents employed in the process of this invention may be of the cationic, anionic or nonionic type and preferably should contain at least 10 carbon atoms in their structure. Typical of such surface active agents are the sodium salts of the long chain alkyl sulfonates, the sodium and amine salts of long chain fatty acids, the sodium salts of sulfated long-chain fatty alcohols, the sodium salts of long chain alkyl benzene sulfonates, the ethylene oxide condensates of hydrophobic organic compounds containing a reactive hydrogen atom such as alkylated phenols, fatty acids, fatty acid amides, fatty alcohols and fatty amines, sulfates of such ethylene oxide condensates, quaternary ammonium compounds containing a long hydrocarbon chain, etc. For a list of additional surface active agents that can be employed in the invention see the comprehensive list of commercially available surface active agents set forth by J. W. McCutcheon in the 1955 July, August, September and October editions of Soap and Chemical Specialties.

The two parameters which have the greatest effect upon the process of the invention are: (1) the time of contact between the particulate styrene polymers and the aqueous solution of surface active agent and (2) the particle size of the particulate foamable styrene polymers. As noted throughout the examples, the reduction in pore size which appears in the foamed styrene polymer beads appears first at the surface of the polymer particle and the depth of the fine porous skin increases with the time the polymer particles are maintained in contact with the aqueous detergent solution. Consequently, the foamable particulate styrene polymer should be maintained in contact with the aqueous surface active agent solution as long as feasible. Since the reduction in the pore size of the foamed styrene polymer is effected in some manner by the action of the surface active agent on the surface of the foamable styrene polymer particles, the beneficial effect of the process is increased as the particle size of the foamable styrene polymers is decreased so as to provide a greater surface area per unit weight of polymer.

The foamable styrene polymer compositions treated by the method of this invention comprises a styrene polymer and a foaming agent which is a volatile organic compound having a boiling point below the softening point of the styrene polymer employed.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene include the conjugated 1,3-dienes, e.g., butadiene, isoprene, etc., alpha, beta-unsaturated monocarboxylic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. If desired, blends of the styrene polymer with other polymers may be employed, e.g., blends of the styrene polymer with rubbery diene polymers or the analogous compositions obtained by dissolving a rubbery diene polymer in styrene monomer and subsequently polymerizing the mixture. In any of the above type resins, all or a portion of the styrene monomer may be replaced with its closely related homologues such as alpha-methylstyrene, o-, m-, and p-ethylstyrenes, o-, m-, and p-methylstyrenes, 2,4-dimethylstyrene, etc. In general, the styrene polymers employed should have a molecular weight in the range of about 40,000–80,000 (as determined by the Staudinger method).

The foaming agent employed in the compositions of the invention may be any organic compound which boils below the softening point of the styrene polymer and which can be incorporated substantially homogeneously therethrough. Preferably, although not mandatorily, the foaming agent should have little or no solvent action on the polymer. Suitable examples of such foaming agents include acetone, methyl alcohol, methyl acetate, ethyl acetate, methyl formate, ethyl formate, dichloroethylene, isopropyl chloride, propionaldehyde and dipropyl ether. Other examples of suitable foaming agents include methyl chloride, dichloroethane, dichlorodifluoroethane and other low-boiling chlorofluoroalkanes. An especially preferred class of foaming agents consist of aliphatic hydrocarbons boiling within the range of about 10° C. to about 80° C., e.g., pentane, hexane, heptane, cyclopentane, cyclopentadiene, and petroleum ethers boiling within the indicated temperature range. If desired, mixtures of two or more foaming agents may be employed.

The treated particulate foamable styrene polymer compositions of this invention may be used interchangeably with non-treated particulate foamable styrene polymer compositions to provide styrene polymer foams of lower density and/or finer pore size.

The above descriptions and particularly the examples are set forth by way of illustration only. Many other variations and modifications thereof will be obvious to those skilled in the art and can be made without departing from the spirit and scope of the invention herein described.

What is claimed is:

1. A method for improving the foaming characteristics of particulate foamable styrene polymers which comprises completely immersing said foamable styrene polymer particles for a period of at least 12 hours in an aqueous solution containing about 1% of a surface active agent containing at least 10 carbon atoms in its chemical structure and having a molecular weight not in excess of about 8,000; the foaming agent included in the particulate foamable styrene polymer being an aliphatic hydrocarbon having a boiling point of about 10–80° C.

2. The method of claim 1 wherein the surface active agent employed is the sodium salt of an alkylaryl sulfonate.

3. The method of claim 1 in which the surface active agent employed is the sodium salt of a sulfated alcohol.

4. The method of claim 1 in which the surface active agent employed is the sodium salt of an alkyl sulfonate.

5. The method of claim 1 in which the surface active agent employed is a quaternary ammonium compound.

6. The method of claim 1 in which the surface active agent employed is an ethylene oxide condensate of a hydrophobic organic compound containing a reactive hydrogen atom and at least 10 carbon atoms in its chemical structure.

References Cited in the file of this patent

UNITED STATES PATENTS 2,797,443  Carlson _____ July 2, 1957